United States Patent [19]

Nesbit

[11] Patent Number: 4,915,670
[45] Date of Patent: Apr. 10, 1990

[54] RADIO EQUIPPED UMBRELLA

[76] Inventor: Mark S. Nesbit, 1248 - 17th, West Des Moines, Iowa 50265

[21] Appl. No.: 197,380

[22] Filed: May 23, 1988

[51] Int. Cl.[4] .............................................. H04B 1/08
[52] U.S. Cl. .................... 455/344; 455/350; 455/351; 135/16
[58] Field of Search ............. 455/344, 350, 351, 347, 455/348, 349, 66; 381/24, 87, 88; 84/DIG. 1, DIG. 3; 135/16

[56] References Cited

U.S. PATENT DOCUMENTS

| | | | |
|---|---|---|---|
| 1,683,270 | 9/1928 | Taylor et al. | 455/344 |
| 1,750,032 | 3/1930 | Timtiman . | |
| 2,791,762 | 5/1957 | Berry | 340/258 |
| 2,927,995 | 3/1960 | Francis | 455/344 |
| 2,966,550 | 12/1960 | Golberg et al. | 455/344 |
| 2,990,471 | 6/1961 | Tiffany | 455/344 |
| 3,114,105 | 12/1963 | Neumiller | 455/351 |
| 3,761,815 | 9/1973 | Bower | 455/344 |
| 4,070,553 | 1/1978 | Hass | 381/24 |
| 4,084,139 | 4/1978 | Jakobe | 455/351 |
| 4,589,134 | 5/1986 | Waldron | 381/24 |
| 4,628,791 | 12/1986 | Phipps | 84/94 C |
| 4,824,139 | 4/1989 | Robbins | 455/344 |

FOREIGN PATENT DOCUMENTS 229356 2/1925 United Kingdom .............. 455/344

Primary Examiner—Benedict V. Safourek
Assistant Examiner—Ralph Smith
Attorney, Agent, or Firm—Henderson & Sturm

[57] ABSTRACT

An umbrella with a hollow interior shaft with a canopy attached at the top portion of said shaft. An audio signal source is attached to the shaft of the umbrella and speaker assemblies are attached to the inside of the canopy of the umbrella. The speaker assemblies are electronically coupled to the audio signal source by wires that are run through the hollow interior of the shaft and exit at the top portion of the shaft and run along the flexible support ribs of the umbrella canopy.

47 Claims, 2 Drawing Sheets

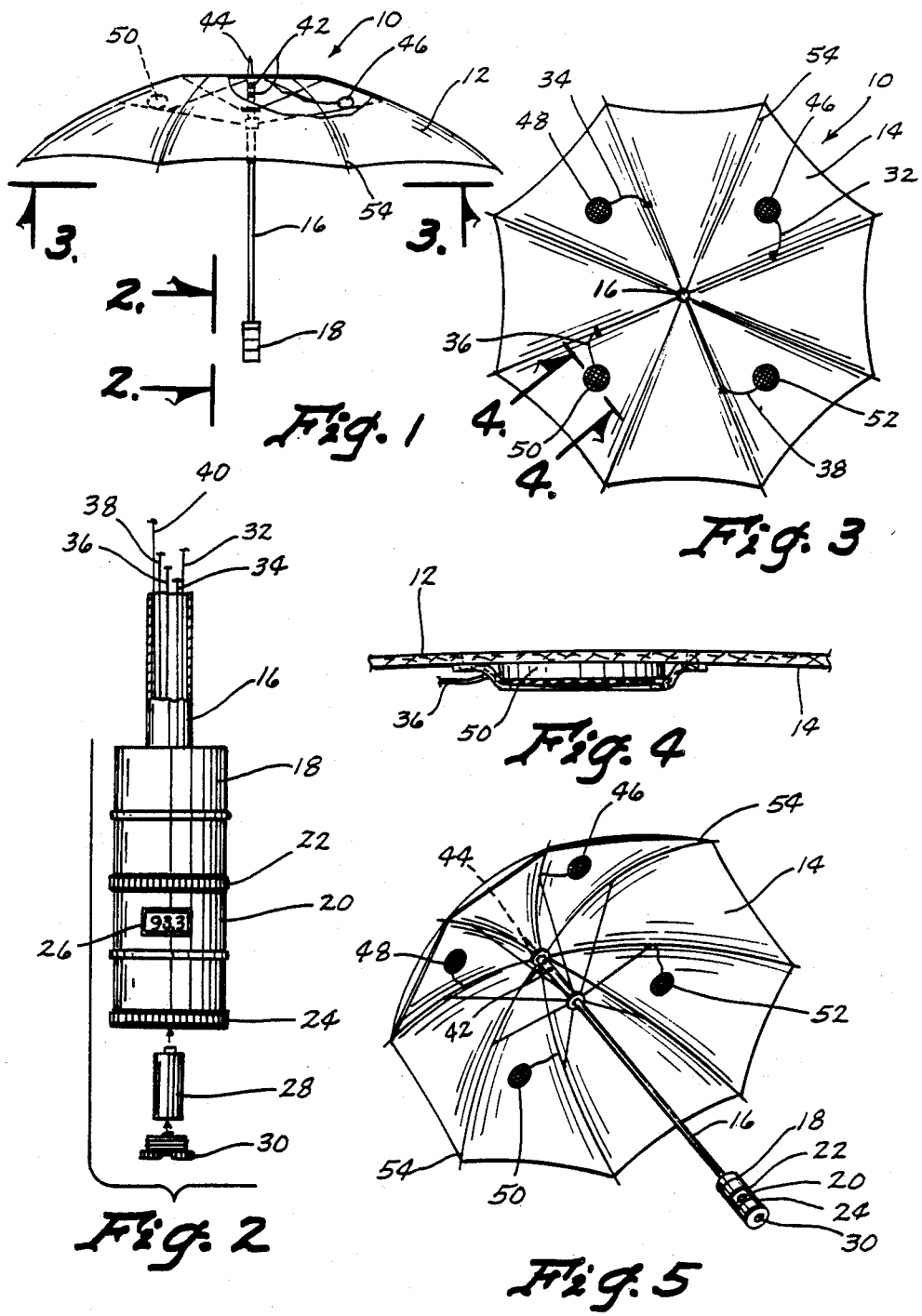

RADIO EQUIPPED UMBRELLA

TECHNICAL FIELD

This invention relates to umbrellas, and more particularly to umbrellas housing an audio signal source with speaker assemblies secured in the inside of the canopy of the umbrella.

BACKGROUND ART

Many prior art devices have a radio built into them, such as U.S. Pat. No. 1,750,032 to M.V. Timtiman which is a pen with a radio. Also, U.S. Pat. No. 2,927,995 to J. A. Francis discloses a fishing rod with a radio in the handle. However, none of the devices disclose a separate, but attached, speaker assembly system. In the case of the '995 reference, one must use the private earphone for listening to the radio. Carrying a portable radio or cassette player in one's pocket or attached to one's body is well known in the art. However, to listen many times earphones or ear jacks must be utilized to fully enjoy the sound of the radio or tape player.

Those concerned with these and other problems recognize the need for an improved umbrella with the speaker assembly contained in the canopy of the umbrella and the audio signal source attached to the shaft of the umbrella.

DISCLOSURE OF THE INVENTION

The present invention provides an umbrella with a hollow interior shaft with a canopy attached at the top portion of said shaft. An audio signal source is attached to the shaft of the umbrella and speaker assemblies are attached to the inside of the canopy of the umbrella. The speaker assemblies are electronically coupled to the audio signal source by wires that are run through the hollow interior of the shaft and exit at the top portion of the shaft and run along the flexible support ribs of the umbrella canopy.

An object of the present invention is the provision of an improved umbrella for listening to an audio signal source.

Another object is to provide an umbrella for listening to an audio signal source that leaves your hands free to hold the umbrella.

A further object of the invention is the provision of an umbrella for listening to an audio signal source that is easy to tune with just one hand, leaving the other hand free to hold the umbrella.

Still another object is to provide an umbrella for listening to an audio signal source that houses the speaker assemblies in the canopy.

A still further object of the present invention is the provision of an umbrella for listening to an audio signal source that is easy to use, inexpensive to manufacture, and has a pleasing eye appeal.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a side elevational view of the umbrella of the present invention;

FIG. 2 is an enlarged, exploded side elevational view of the handle grip of the umbrella showing the audio signal source integrally formed therein, showing the battery compartment in the bottom end of the handle grip, and having a portion cut away showing the speaker wires and the antenna wire in the hollow shaft of the umbrella;

FIG. 3 is a bottom plan view of the inside of the canopy of the umbrella showing the preferred placement of multiple speaker assemblies on the canopy;

FIG. 4 is an enlarged sectional view of a speaker assembly secured to the inside of the canopy taken along line 4—4 of FIG. 3;

FIG. 5 is a perspective view of the umbrella in an open position showing placement of the speaker assemblies on the inside of the canopy and showing the wires exiting the grommets in the upper end of the shaft of the umbrella;

BEST MODE FOR CARRYING OUT THE INVENTION

Figure 6:
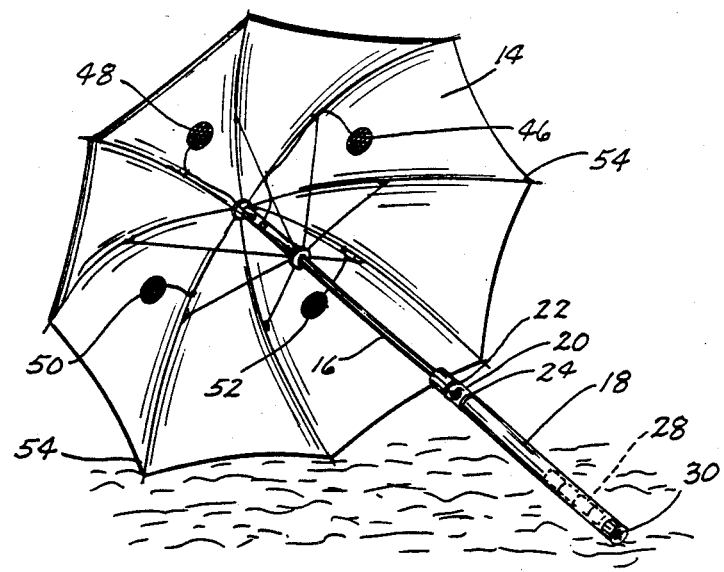
FIG. 6 is a perspective view of an alternate embodiment of the umbrella adapted for use on the beach.

Referring now to the drawings, wherein like reference numerals designate identical or corresponding parts throughout the several views, FIG. 1 shows the umbrella generally at 10. The umbrella (10) comprises a canopy outerside (12), an inside (14) (FIG. 3), a shaft (16) and handle grip (18).

Referring now to FIG. 2, the audio signal source (20) shown is a radio formed as part of the grip (18) of the umbrella (10). Tuning control (22) and volume control (24) are disposed around the circumference of the handle grip (18) for selectively tuning and controlling the volume of the audio signal source (20). The frequency of the station selected is shown in the indicator window (26). The power supply (28) is inserted from the bottom to supply power to the radio (20). An end cap (30) secures the power supply (28) in place. Four conducting wires (32, 34, 36, 38) run up through the hollow shaft 916) and exit through grommets (42) in the upper end of shaft (16). The remaining wire is the antenna wire 940) and it connects the audio signal source (20) to the antenna (44) at the top portion of the shaft (16).

Referring now to FIGS. 3, 5 and 6, speaker assemblies (46, 48, 50, 52) are shown attached to the canopy inside (14) of the umbrella (10) by stitching or gluing them in place. The conducting wires (32, 34, 36, 38) exit the appropriate grommets (42) and run along the flexible support ribs 954) and connect to the appropriate speaker assembly (46, 48, 50, 52).

FIG. 6 shows an alternate embodiment, such as a beach umbrella, with the power supply (28) located inside the hollow shaft (16) which is connected to the umbrella (10). Audio signal source (20) is located midway up the handle grip (18) and tuning control (22) and volume control (24) are disposed around the circumference of the grip (18).

Figure 7:
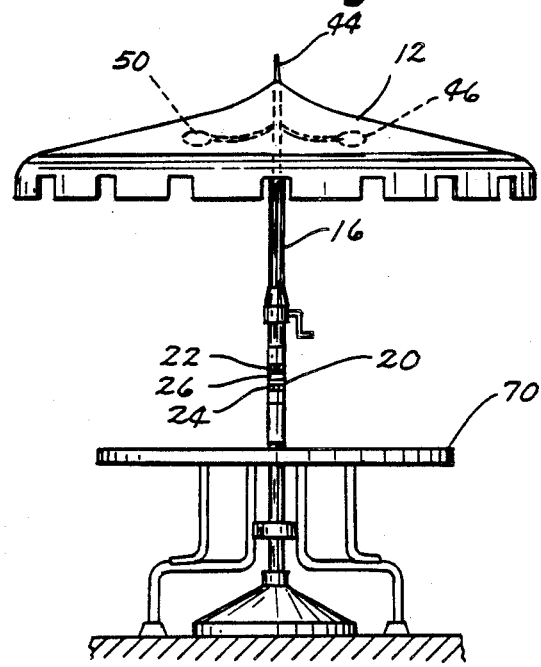
FIG. 7 is a side elevational view of an alternate embodiment of the umbrella adapted for use on a patio table.

FIG. 7 is an alternate embodiment, such as a patio umbrella supported on a patio table (70). The audio signal source (20) is located on the shaft (16) of the umbrella (10) above the table (70).

In use, the umbrella (10) is raised to its open position. A power supply (28) having been previously inserted into the handle grip (18) is secured by shaft end cover (30). The on/off volume control (24) is turned on and the appropriate station selected by use of the tuning control (22). The user is thus fully enclosed in a canopy of sound. One simply reverses all of the above steps upon completion of use of the umbrella (10).

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. An umbrella comprising:
   an elongated shaft having a top portion, and a bottom portion;
   a canopy having an outside, an inside, and a number of flexible support ribs extending from said shaft at the center of said canopy outwardly to the edges of said canopy, said canopy being attached to the top portion of said shaft and being movable between an open position and a closed position;
   an audio signal source attached to said umbrella;
   a power supply to activate the audio signal source housed by said shaft;
   a speaker assembly attached to the umbrella; and
   means for electronically coupling said speaker assembly to said audio signal source.

2. The umbrella of claim 1 wherein said shaft has a hollow interior and wherein said electronic coupling means includes conducting wires running from the audio signal source, up the hollow interior of said shaft to the speaker assembly attached to the canopy of said umbrella.

3. The umbrella of claim 2 wherein said conducting wires exit the hollow interior of said shaft of the umbrella through a grommet near the top portion of said shaft.

4. The umbrella of claim 1 wherein said audio signal source is attached to the bottom portion of said shaft and forms a handle grip.

5. The umbrella of claim 4 wherein said audio signal source includes a tuning control disposed around the circumference of said handle grip.

6. The umbrella of claim 4 wherein said audio signal source includes a volume control disposed around the circumference of said handle grip.

7. The umbrella of claim 5 wherein said audio signal source includes a volume control disposed around the circumference of said handle grip.

8. The umbrella of claim 1 wherein the top portion of said shaft is an antenna electronically coupled to said audio signal source.

9. The umbrella of claim 3 wherein the conducting wires run from the grommet in said shaft along the flexible support ribs and connect to said speaker assembly on the inside of said canopy.

10. The umbrella of claim 1 wherein said speaker assembly is secured to the inside of said canopy by means of stitching.

11. The umbrella of claim 1 wherein said speaker assembly is secured to the inside of the canopy by means of gluing.

12. The umbrella of claim 1 wherein said audio signal source is a radio.

13. The umbrella of claim 1 wherein said audio signal source is a tape player.

14. The umbrella of claim 1 wherein said audio signal source is a compact disc player.

15. The umbrella of claim 1 further including a plurality of speaker assemblies attached to the inside of said canopy of said umbrella.

16. The umbrella of claim 1 wherein said umbrella is a beach umbrella.

17. The umbrella of claim 1 wherein said umbrella is a patio umbrella.

18. An umbrella comprising:
   an elongated shaft having a top portion, and a bottom portion;
   a canopy having an outside, an inside, and a number of flexible support ribs extending from said shaft at the center of said canopy outwardly to the edges of said canopy, said canopy being attached to the top portion of said shaft and being movable between an open position and a closed position;
   an audio signal source attached to the bottom portion of said shaft to form a handle grip wherein said audio signal source includes a tuning control disposed around the circumference of said handle grip;
   a speaker assembly attached to the umbrella; and
   means for electronically coupling said speaker assembly to said audio signal source.

19. The umbrella of claim 18 wherein said audio signal source includes a volume control disposed around the circumference of said handle grip.

20. The umbrella of claim 18 wherein said shaft has a hollow interior and wherein said electronic coupling means includes conducting wires running from the audio signal source, up the hollow interior of said shaft to the speaker assembly attached to the canopy of said umbrella.

21. The umbrella of claim 20 wherein said conducting wires exit the hollow interior of said shaft of the umbrella through a grommet near the top portion of said shaft.

22. The umbrella of claim 18 wherein the top portion of said shaft is an antenna electronically coupled to said audio signal source.

23. The umbrella of claim 18 wherein said shaft houses the power supply to activate the audio signal source.

24. The umbrella of claim 21 wherein the conducting wires run from the grommet in said shaft along the flexible support ribs and connect to said speaker assembly on the inside of said canopy.

25. The umbrella of claim 18 wherein said speaker assembly is secured to the inside of said canopy by means of stitching.

26. The umbrella of claim 18 wherein said speaker assembly is secured to the inside of the canopy by means of gluing.

27. The umbrella of claim 18 wherein said audio signal source is a radio.

28. The umbrella of claim 18 wherein said audio signal source is a tape player.

29. The umbrella of claim 18 wherein said audio signal source is a compact disc player.

30. The umbrella of claim 18 further including a plurality of speaker assemblies attached to the inside of said canopy of said umbrella.

31. The umbrella of claim 18 wherein said umbrella is a beach umbrella.

32. The umbrella of claim 18 wherein said umbrella is a patio umbrella.

33. An umbrella comprising:

an elongated shaft having a top portion, and a bottom portion;

a canopy having an outside, an inside, and a number of flexible support ribs extending from said shaft at the center of said canopy outwardly to the edges of said canopy, said canopy being attached to the top portion of said shaft and being movable between an open position and a closed position;

an audio signal source attached to the bottom portion of said shaft to form a handle grip wherein said audio signal source includes a volume control disposed around the circumference of said handle grip;

a speaker assembly attached to the umbrella; and means for electronically coupling said speaker assembly to said audio signal source.

34. The umbrella of claim 33 wherein said audio signal source includes a tuning control disposed around the circumference of said handle grip.

35. The umbrella of claim 33 wherein said shaft has a hollow interior and wherein said electronic coupling means includes conducting wires running from the audio signal source, up the hollow interior of said shaft to the speaker assembly attached to the canopy of said umbrella.

36. The umbrella of claim 35 wherein said conducting wires exit the hollow interior of said shaft of the umbrella through a grommet near the top portion of said shaft.

37. The umbrella of claim 34 wherein the top portion of said shaft is an antenna electronically coupled to said audio signal source.

38. The umbrella of claim 33 wherein said shaft houses the power supply to activate the audio signal source.

39. The umbrella of claim 36 wherein the conducting wires run from the grommet in said shaft along the flexible support ribs and connect to said speaker assembly on the inside of said canopy.

40. The umbrella of claim 33 wherein said speaker assembly is secured to the inside of said canopy by means of stitching.

41. The umbrella of claim 33 wherein said speaker assembly is secured to the inside of the canopy by means of gluing.

42. The umbrella of claim 33 wherein said audio signal source is a radio.

43. The umbrella of claim 33 wherein said audio signal source is a tape player.

44. The umbrella of claim 33 wherein said audio signal source is a compact disc player.

45. The umbrella of claim 33 further including a plurality of speaker assemblies attached to the inside of said canopy of said umbrella.

46. The umbrella of claim 33 wherein said umbrella is a beach umbrella.

47. The umbrella of claim 33 wherein said umbrella is a patio umbrella.

* * * * *